(12) United States Patent
Hellwig et al.

(10) Patent No.: US 9,575,912 B2
(45) Date of Patent: Feb. 21, 2017

(54) SERVICE REQUEST INTERRUPT ROUTER WITH SHARED ARBITRATION UNIT

(71) Applicant: Infineon Technologies AG, Neubiberg (DE)

(72) Inventors: Frank Hellwig, Wunstorf (DE); Simon Cottam, Bristol (GB); Krishnapriya Chakiat Ramamoorthy, Bristol (GB)

(73) Assignee: Infineon Technologies AG, Neubiberg (DE)

(*) Notice: Subject to any disclaimer, the term of this patent is extended or adjusted under 35 U.S.C. 154(b) by 375 days.

(21) Appl. No.: 14/247,972

(22) Filed: Apr. 8, 2014

(65) Prior Publication Data
US 2015/0286596 A1  Oct. 8, 2015

(51) Int. Cl.
G06F 13/00 (2006.01)
G06F 13/26 (2006.01)
G06F 13/28 (2006.01)

(52) U.S. Cl.
CPC ............... *G06F 13/26* (2013.01); *G06F 13/28* (2013.01); *Y02B 60/1228* (2013.01)

(58) Field of Classification Search
CPC .................................. G06F 13/26; G06F 13/18
See application file for complete search history.

(56) References Cited

U.S. PATENT DOCUMENTS 8,352,804 B2   1/2013  Hellwig et al.
2014/0047150 A1* 2/2014 Marietta .................. G06F 13/14
                                                                 710/264

* cited by examiner

*Primary Examiner* — Zachary K Huson
(74) *Attorney, Agent, or Firm* — Schiff Hardin LLP

(57) ABSTRACT

A service request interrupt router having Interrupt Control Units (ICUs); and an arbitration unit configured to be shared by the ICUs to arbitrate among Service Request Nodes (SRNs) that have respective service request interrupt signals and that are mapped to the ICUs, to determine for each of the ICUs which of the SRNs has a highest priority.

18 Claims, 5 Drawing Sheets

Figure 4

Shared Arbitration Unit for two ICUs (ICU0 and ICU1) — 400

| Stage 1 | No SR pending | Arb ICU0 | Arb ICU0 | Arb ICU0 | Arb ICU0 | Arb ICU0 | Arb ICU0 | Arb ICU0 |
|---|---|---|---|---|---|---|---|---|
| Stage 2 | | No SR pending | Arb ICU0 | Arb ICU0 | Arb ICU0 | Arb ICU0 | Arb ICU0 | Arb ICU0 |
| Stage 3 | | | No SR pending | Arb ICU0 | Arb ICU0 | Arb ICU0 | Arb ICU0 | Arb ICU0 |

← Service Request(s) to ICU0 Pending

← Service Request(s) to ICU1 Pending

Figure 5

Shared Arbitration Unit for three ICUs at a time — 500

| Stage 1 | No SR pending | Arb ICU0 | Arb ICU0 | Arb ICU0 | Arb ICU2 | Arb ICU2 | Arb ICU2 | Arb ICU1 |
|---|---|---|---|---|---|---|---|---|
| Stage 2 | | No SR pending | Arb ICU0 | Arb ICU0 | Arb ICU0 | Arb ICU2 | Arb ICU1 | Arb ICU2 |
| Stage 3 | | | No SR pending | Arb ICU0 | Arb ICU2 | Arb ICU0 | Arb ICU2 | Arb ICU1 |

← Service Request(s) to ICU0 Pending

← Service Request(s) to ICU2 Pending

← Service Request(s) to ICU1 Pending

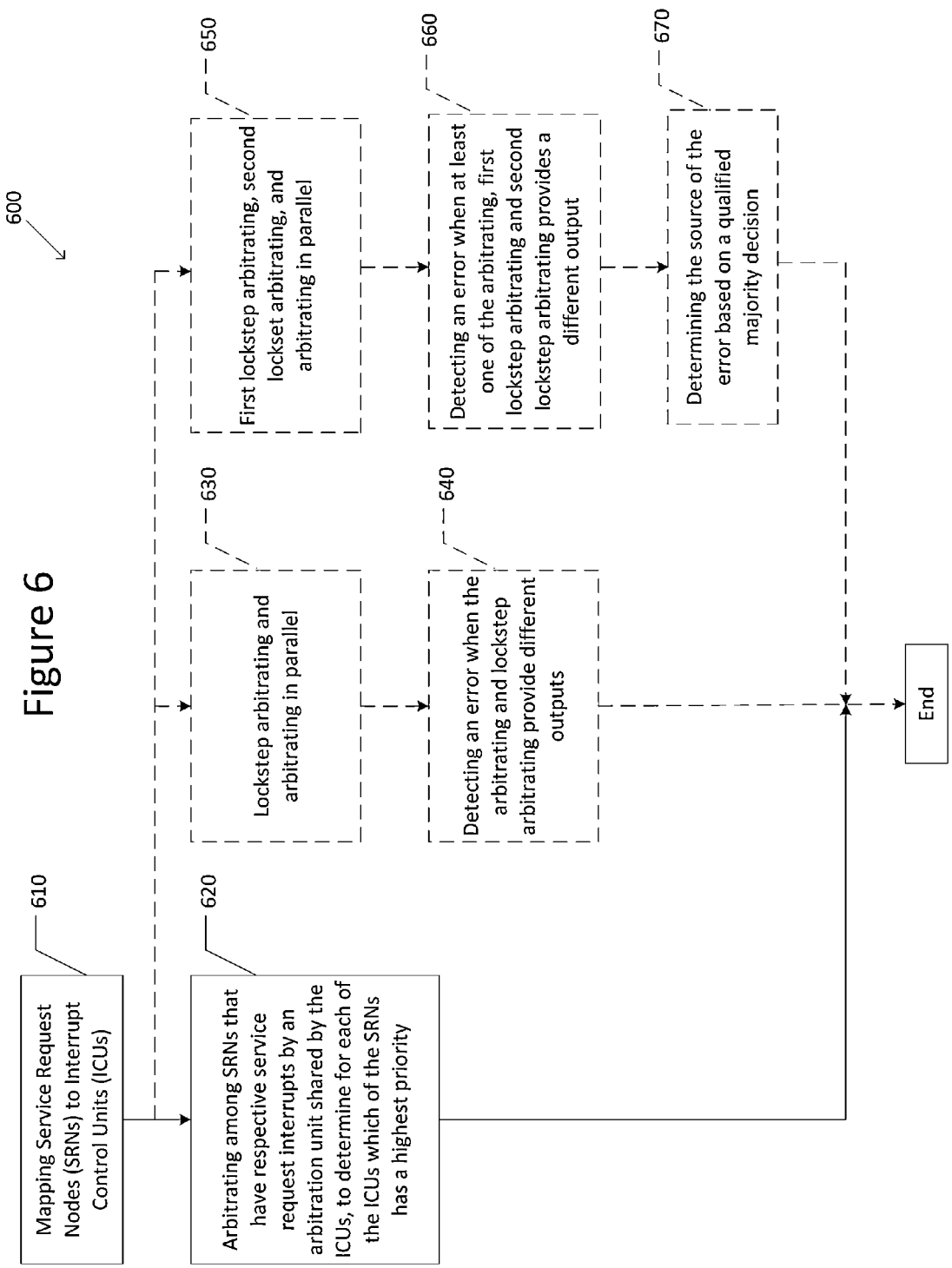

SERVICE REQUEST INTERRUPT ROUTER WITH SHARED ARBITRATION UNIT

BACKGROUND

A service request interrupt router is an interface between on-chip service request interrupt signals and service providers that respond to these interrupt signals. The interrupt router arbitrates among the service request interrupt signals, which are based on hardware events or triggers, and forwards a winner to one of the service providers (e.g., Central Processing Unit (CPU), Direct Memory Access (DMA), etc.).

The service request interrupt router includes a Service Request Node (SRN) for each service request interrupt signal, and an Interrupt Control Unit (ICU) for each of the service providers. A typical multi-core service request interrupt router may have several hundred SRNs and multiple ICUs.

In current interrupt service request routers, each ICU has its own arbitration unit to arbitrate among all SRNs having respective pending service request interrupt signals that is assigned or mapped thereto. Also, each ICU arbitrates independently from other ICUs.

BRIEF DESCRIPTION OF THE DRAWINGS

FIG. 4 illustrates pipeline stages of an arbitration sequence for an arbitration unit shared by two ICUs in accordance with an exemplary embodiment.

FIG. 5 illustrates pipeline stages of an arbitration sequence for an arbitration unit shared by three ICUs in accordance with an exemplary embodiment.

FIG. 6 illustrates a flowchart of a method of arbitrating service request interrupt signals in accordance with an exemplary embodiment.

DETAILED DESCRIPTION

The present disclosure is directed to a service request interrupt router having Interrupt Control Units (ICUs), and an arbitration unit configured to be shared by the ICUs to arbitrate among Service Request Nodes (SRNs) that have respective service request interrupt signals and that are mapped to the ICUs, to determine for each of the ICUs which of the SRNs has a highest priority. The benefits of greater than one ICU sharing an arbitration unit include reduction in the area occupied by the service request interrupt router and reduction in dynamic/static power consumption.

Figure 1:
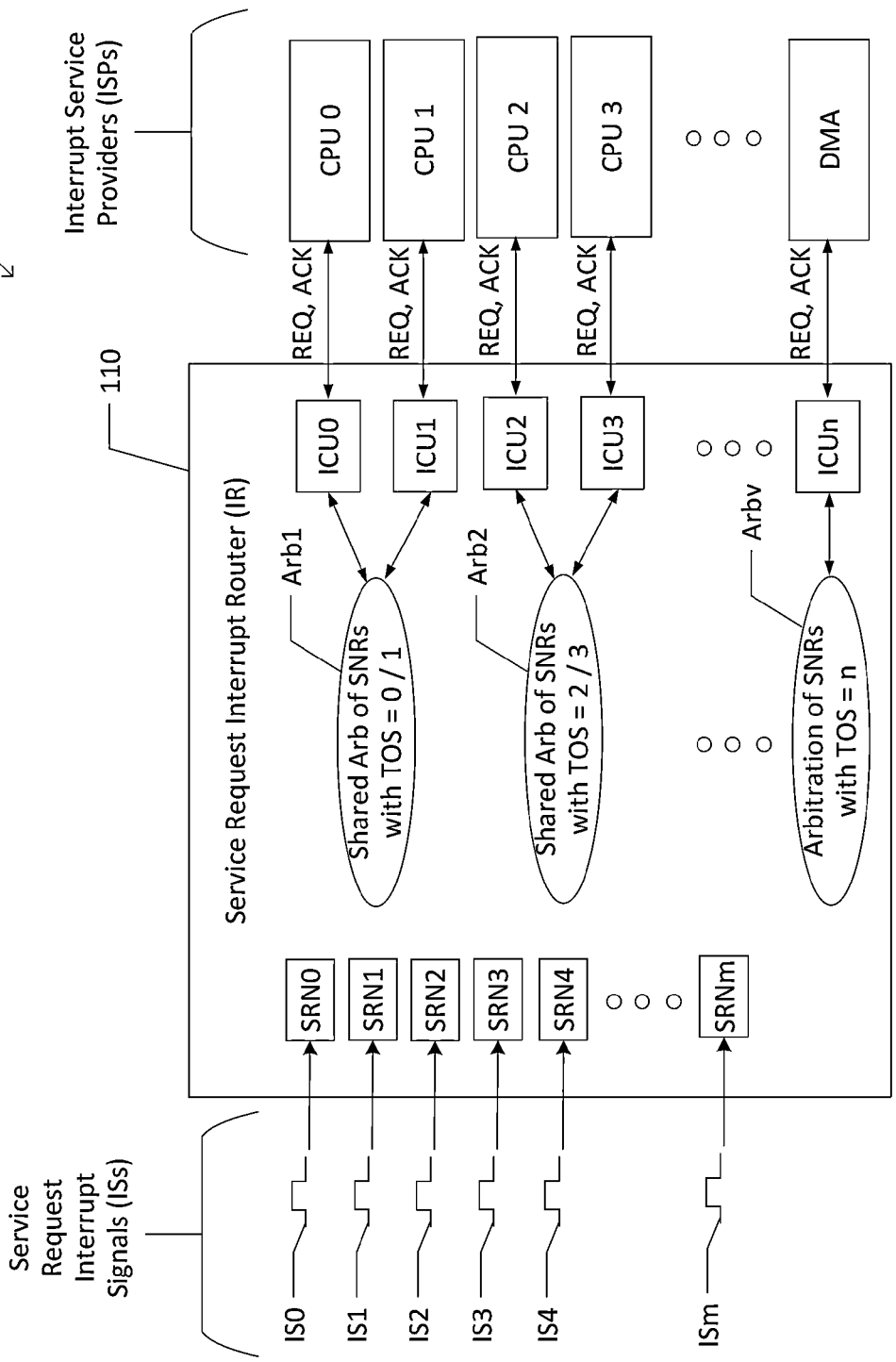
FIG. 1 illustrates a schematic diagram of an arbitration system having a service request interrupt router in accordance with an exemplary embodiment.

FIG. 1 illustrates a schematic diagram of a system 100, which may be a System-on-Chip (SoC), having a service request interrupt router 110 in accordance with an exemplary embodiment.

The service request interrupt router 110 includes Service Request Nodes SRN0-SRNm, Interrupt Control Units ICU0-ICUn, and arbitration units Arb1-Arbv.

There is a Service Request Node SRN0-SRNm for each service request interrupt signal IS0-ISn. The service request interrupt signals IS0-ISn are based on respective service requests, which are also known as interrupts. Each Service Request Node SRN0-SRNm has a service request control register and is configurable regarding, for example, Service Request Priority Number (SRPN) and Type of Service (TOS). The SRPN is a register bit field that defines the priority of the Service Request Node SRN0-SRNm. The TOS is a register bit field that defines to which of the Interrupt Control Units ICU0-ICUn the Service Request Node SRN0-SRNm is mapped.

There is one dedicated an Interrupt Control Unit ICU0-ICUn for each Interrupt Service Provider (ISP) CPU0-CPU3 . . . DMA. The Interrupt Service Providers ISP are on-chip resources that execute the service requests.

The tasks the service request interrupt router 110 may perform include, for example, assignment of priorities among Service Request Nodes SRN0-SRNm with pending service request interrupt signals, assignment of these Service Request Nodes SRN0-SRNm to the Interrupt Control Units ICU0-ICUn, and arbitration among these Service Request Nodes SRN0-SRNm assigned to each of these Interrupt Control Units ICU0-ICUn. At least one arbitration unit Arb is shared by any of the Interrupt Control Units ICU0-ICUn. An arbitration unit Arb is configured to arbitrate for each of its Interrupt Control Units ICUs among Service Request Nodes SRN0-SRNm having respective pending service request interrupt signals IS0-ISm to determine which of these Service Request Nodes SRN0-SRNm has a highest priority for service, that is, is a "winner" of the arbitration.

More specifically, arbitration unit Arb1 of FIG. 1 is shared by Interrupt Control Units ICU0 and ICU1 to arbitrate among Service Request Nodes SRNs that have respective service request interrupt signals ISs having a Type of Service (TOS) 0 or 1 and are thus mapped to Interrupt Control Unit ICU0 and ICU1, respectively. Arbitration unit Arb1 arbitrates to determine for each of the Interrupt Control Units ICU0 and ICU1, which of these Service Request Nodes SRNs has a highest priority.

Similarly, arbitration unit Arb2 is shared by Interrupt Control Units ICU2 and ICU3 to arbitrate among Service Request Nodes SRNs that have respective service request interrupt signals ISs having a TOS 2 or 3 and are thus mapped to Interrupt Control Units ICU2 and ICU3, respectively. Arbitration unit Arb2 arbitrates to determine for each of the Interrupt Control Units ICU2 and ICU3, which of these Service Request Nodes SRNs has a highest priority.

Arbitration units Arb1 and Arb2 are each shown in FIG. 1 as being shared by two Interrupt Control Units ICU0 and ICU1, and ICU2 and ICU3, respectively. However, the disclosure is not limited in this respect. Each of the arbitration units Arb1-Arbv may be shared by any number of the Interrupt Control Units ICU0-ICUn as suitable for the particular application.

There is a dedicated service request node SRN0-SRNm for each service request interrupt signal IS0-ISm, respectively. The Service Request Nodes SRN0-SRNm and their associated interrupt service request signals IS0-ISm are configurable with respect to Service Request Priority Number (SRPN) and Type Of Service (TOS). The TOS determines to which of the Interrupt Service Providers CPU0-CPU3 . . . DMA the respective interrupt service request signal IS0-ISm is to be forwarded or mapped, where the TOS may be, for example read data, transmit data, an error condition, etc.

When the service request interrupt router 110 receives service request interrupt signals IS0-ISm at its respective Service Request Nodes SRN0-SRNm, these Service Request Nodes SRN0-SRNm are mapped to Interrupt Control Units ICU0-ICUn and their associated Interrupt Service Providers CPU0-CPU3 . . . DMA that will service the service requests. Each arbitration unit Arb performs an arbitration to determine for each of its Interrupt Control Units ICUs which of the Service Request Nodes SRNs having pending service request interrupt signals IS has a highest priority, that is, is a "winner" of the arbitration round. The respective Interrupt Control Units ICUs informs its associated Interrupt Service Provider ISP, via a service request REQ, which of the Service Request Nodes SRNs is the winner of the arbitration round. When ready, the Interrupt Service Provider ISP responds to the Interrupt Control Unit ICU with an acknowledgement signal ACK and then services the interrupt service request service signal IS. The Interrupt Service Provider's software knows to service the service request interrupt signal based on the SRPN and the TOS.

The service request interrupt router 110 may include a plurality of arbitration units Arb1-Arbv. Each of the arbitration units Arb1-Arbv is configured to be shared by a subset of the Interrupt Control Units ICU0-ICUn. Each of the arbitration units Arb1-Arbv arbitrates for the subset of Interrupt Control Units ICU0-ICUn in a time-multiplexed sequence, also known as a time-sliced manner or round-robin scheme. The arbitration is conducted for each of the Interrupt Control Units ICU0-ICUn among those of the Service Request Nodes SRN0-SRNm that have pending service request interrupt signals ISs to determine which of the Service Request Nodes SRN0-SRNm has a highest priority. A more detailed explanation of the arbitration process follows.

Figure 2A:
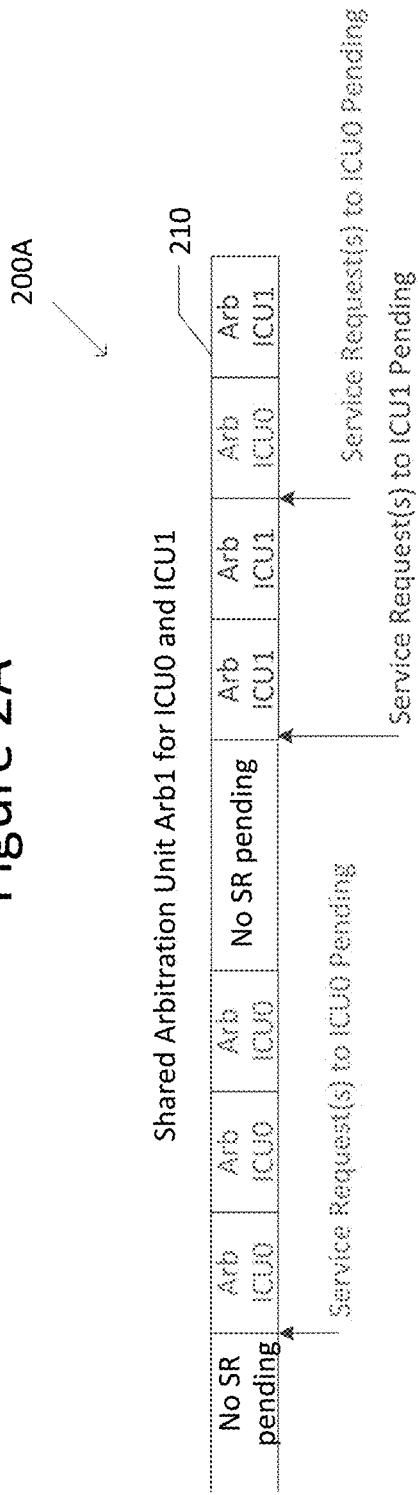
FIG. 2A illustrates an arbitration sequence for an arbitration unit shared by two Interrupt Control Units (ICUs) in accordance with another exemplary embodiment.

FIG. 2A illustrates an arbitration sequence 200A for an arbitration unit Arb1 shared by two Interrupt Control Units ICU0, ICU1 in accordance with an exemplary embodiment.

By way of overview, interrupts may be pending for two Interrupt Control Units ICU0 and ICU1, with one group of Service Request Nodes SRNs mapped to Interrupt Control Unit ICU0, and another group of Service Request Nodes SRNs mapped to ICU1. The sharing of the arbitration unit Arb1 (shown in FIG. 1) may be realized between the Interrupt Control Units ICU0 and ICU1 in a time-multiplexed sequence. When service request interrupt signals ISs are pending for both of Interrupt Control Units ICU0 and ICU1, the arbitration unit Arb1 arbitrates in a first cycle for all pending service request interrupt signals ISs for Interrupt Control Unit ICU0, then in a next cycle for all pending service request interrupt signals ISs for Interrupt Control Unit ICU1, then Interrupt Control Unit ICU0, then Interrupt Control Unit ICU1, and so on (ICU0, ICU1, ICU0, ICU1, . . . ). An arbitration round is assumed, for the sake of this example and the examples that follow, to take three cycles, though the disclosure is not limited in this respect.

Referring first to the left-most portion of the figure, when neither of the Interrupt Control Units ICU0, ICU1 is mapped to a Service Request Node SRN having a pending service request interrupt signal IS based on a service request, then the arbitration unit Arb1 does not perform any arbitration.

When there are one or more service request interrupt signal ISs pending for Interrupt Control Unit ICU0, but not for Interrupt Control Unit ICU1, then the arbitration unit Arb1 can be fully utilized by Interrupt Control Unit ICU0 and arbitrate for Interrupt Control Unit ICU0 only (ICU0, ICU0, ICU0, . . . ). Conversely, when there are one or more service request interrupt signals ISs pending for Interrupt Control Unit ICU1 but not for Interrupt Control Unit ICU0, than the arbitration unit Arb1 begins arbitration for Interrupt Control Unit ICU1 only (ICU1, ICU1 . . . ). If one or more service request interrupt signals ISs are then received by arbitration unit Arb1 from Interrupt Control Unit ICU0 before the arbitration round for Interrupt Control Unit ICU1 is completed, service request interrupt signals ISs are pending for both Interrupt Control Units ICU0 and ICU1, and arbitration unit Arb1 arbitrates in a time-multiplexed sequence for a first cycle of Interrupt Control Unit ICU0, then a next cycle for Interrupt Control Unit ICU1, etc.

Figure 2B:
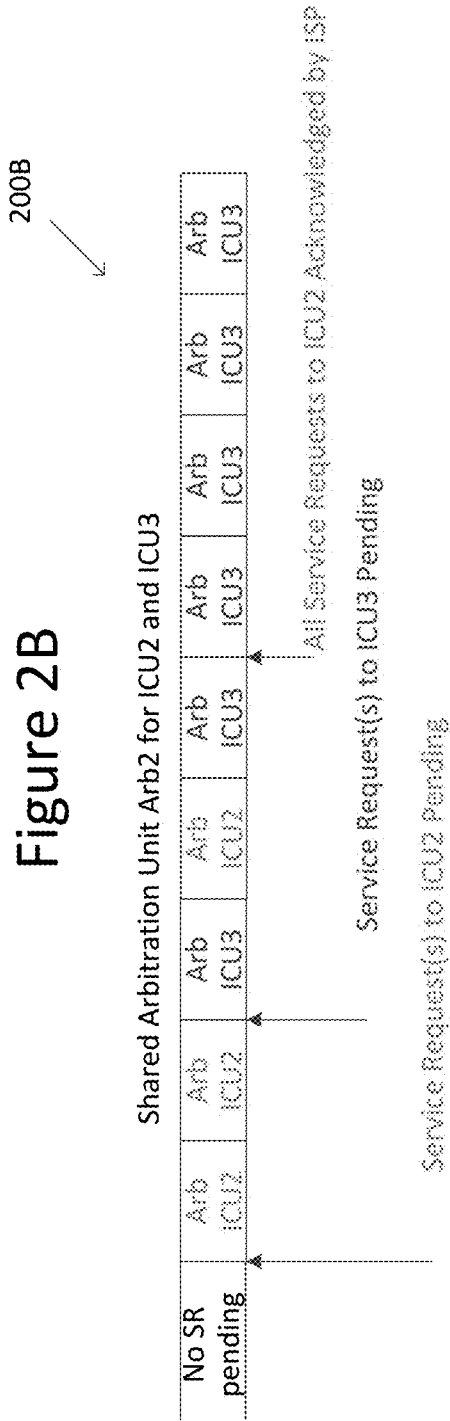
FIG. 2B illustrates an arbitration sequence for an arbitration unit shared by two ICUs in accordance with an exemplary embodiment.

FIG. 2B illustrates an arbitration sequence 200B for an arbitration unit Arb2 shared by two Interrupt Control Units ICU2 and ICU3 in accordance with another exemplary embodiment.

Referring first to the left-most portion of the figure, when there are no service request interrupt signals ISs pending for either of the Interrupt Control Units ICU2 and ICU3, the arbitration unit Arb2 does not perform any arbitration. When there are one or more interrupt service request signals ISs pending for Interrupt Control Unit ICU2, but not for Interrupt Control Unit ICU3, then the arbitration unit Arb2 arbitrates for Interrupt Control Unit ICU2 only (ICU2, ICU2 . . . ). If one or more service request interrupt signals ISs are then received by arbitration unit Arb2 before the arbitration for Interrupt Control Unit ICU2 completes its arbitration round of in this example three cycles, then service request interrupt signals ISs are pending for both Interrupt Control Units ICU2 and ICU3. Arbitration unit Arb2 then arbitrates for Interrupt control Units ICU2 and ICU3 in a time-multiplexed sequence, that is, in one cycle for Interrupt Control Unit ICU2, then for the last cycle of the arbitration round for Interrupt Control Unit ICU3, than in a next cycle back to Interrupt Control Unit ICU2.

Once a winner for Interrupt Control Unit ICU2 is determined, a service request signal REQ is sent by the Interrupt Control Unit ICU2 to its associated Interrupt Service Provider CPU2 (see FIG. 1). CPU2 when it is ready acknowledges the request signal REQ with an acknowledgment signal ACK and provides the requested service. At this point a service request interrupt signal IS is pending for Interrupt Control Unit ICU3 but not for Interrupt Control Unit ICU2, and the arbitration unit Arb2 arbitrates for Interrupt Control Unit ICU3 only (ICU3, ICU3, ICU3, . . . ).

The arbitration unit Arb1 may be configured to arbitrate in a time-multiplexed sequence that is flexible, as described above. In an alternative embodiment, the arbitration may be performed in a time-multiplexed sequence that is fixed, that is, independent of Interrupt Control Units ICU0, ICU1 having mapped thereto any Service Request Nodes SRNs with pending service request interrupt signals ISs. For example, even if Interrupt Control Unit ICU0 is the only Interrupt Control Unit ICU having one or more service requests pending, rather than arbitrating for this Interrupt Control Unit ICU0 only (ICU0, ICU0, ICU0, . . . ), the arbitration unit Arb1 continues to arbitrate in a time-multiplexed sequence for both of its Interrupt Control Units ICU0 and ICU1 (ICU0, ICU1, ICU0, ICU1, . . . ).

Figure 3:
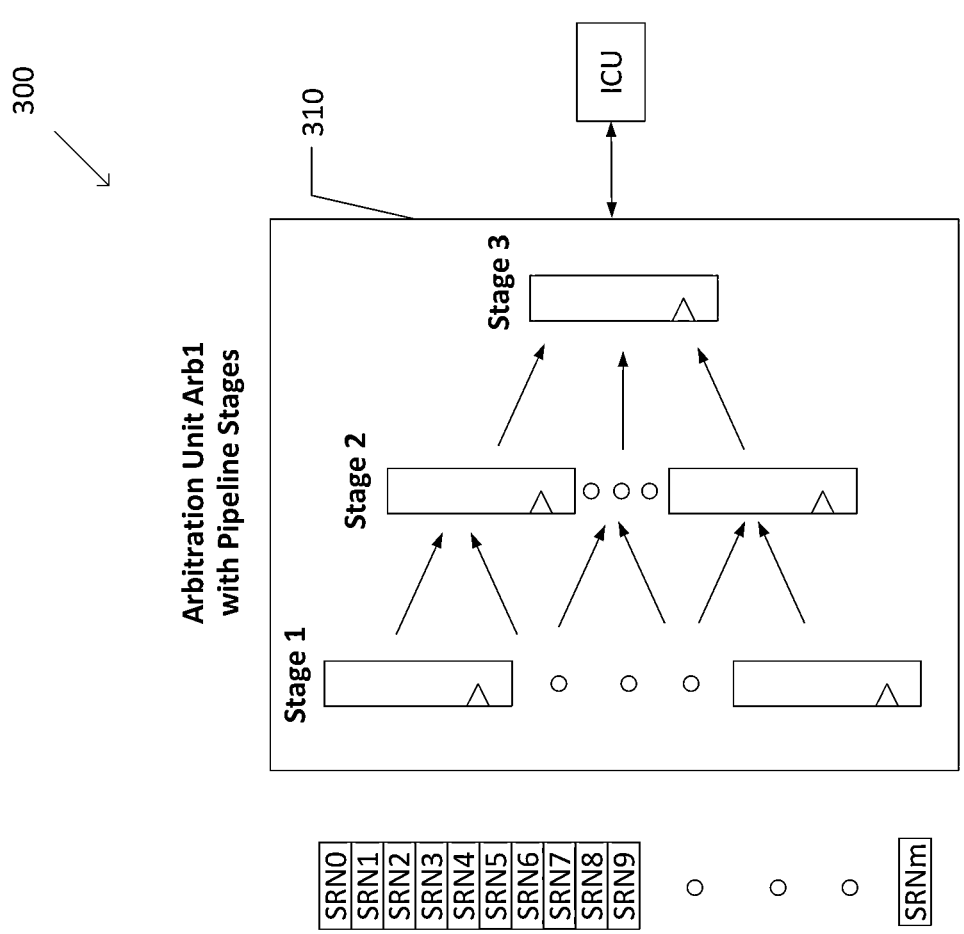
FIG. 3 illustrates a schematic diagram of an arbitration unit with pipeline stages in accordance with an exemplary embodiment.

FIG. 3 illustrates a schematic diagram of an arbitration unit with three pipeline stages 310 in accordance with an exemplary embodiment.

Arbitration unit 310, which is equivalent to arbitration unit Arb1 shown in FIG. 1, is implemented with pipeline stages in order to manage the large number of Service Request Nodes SRN0-SRNm having pending service request interrupt signals ISs. A pipeline stage is equivalent to a cycle, and as described above, in the examples of this disclosure each arbitration round has three cycles.

The arbitration unit 310 identifies which of the Service Request Nodes SRN0-SRNm are mapped to the Interrupt Control Units ICU0 and ICU1, and determines for each Interrupt Control Unit ICU0, ICU1 which Service Request Node SRN has a highest priority, that is, is a "winner" of the arbitration round. This arbitration is not accomplished in one cycle in some systems due to physical constraints. Therefore the arbitration unit 310 of this exemplary embodiment is implemented for each Interrupt Control Unit ICU0, ICU1 in three pipeline stages using a time-multiplexed sequence as discussed above.

The Interrupt Control Unit ICU sends a request signal REQ for the winning Service Request Node SRN from Stage 3 to the associated Interrupt Service Provider ISP. The Interrupt Service Provider ISP may take some time before it is available to acknowledge the request signal REQ. When the Interrupt Service Provider ISP is ready, it responds to the Interrupt Control Unit ICU0 or ICU1 with an acknowledgement signal ACK, and the Interrupt Control Unit ICU0 or ICU1 clears the interrupt service request signal IS and associated Service Request Node SRN, and the interrupt service request signal IS is then no longer pending. The request signal REQ and acknowledgment signal ACK identifies the Service Request Node SRN using its index number and SRPN.

If the Interrupt Service Provider is a Central Processing Unit (CPU), for example, the Service Request Node with pending interrupt service request signals may not be executed immediately. The CPU might take some time until it is ready to acknowledge the Service Request Node SRN. If the Interrupt Service Provider ISP is a Direct Memory Access (DMA), on the other hand, then the related DMA may acknowledge and service the winning Service Request Node SRN immediately.

Although FIG. 3 shows pipelining with three stages, the disclosure is not limited in this respect. There may be any number of stages as suitable for the application.

FIG. 4 illustrates pipeline stages of an arbitration sequence 400 for an arbitration unit Arb1 shared by two Interrupt Control units ICU0 and ICU1 in accordance with an exemplary embodiment.

The pipeline has three stages or cycles, as shown in three respective horizontal rows. Stage 1 is equivalent to the arbitration sequences illustrated in each of FIGS. 2A and 2B. Stage 1 for each cycle can be switched to a different Interrupt Control Unit ICU. In the first cycle, the arbitration unit Arb1 starts an arbitration round for Interrupt Control Unit ICU0. In the second cycle, the arbitration unit Arb1 starts the stage 1 pipeline input of a new arbitration round for this same Interrupt Control Unit ICU0; meanwhile the first arbitration round for Interrupt Control Unit ICU0 is now in Stage 2. In the third cycle, the arbitration unit Arb1 determines at Stage 3 the Service Request Node SRN that is the winner of the first arbitration round. When the arbitration unit Arb1 starts an arbitration round for Interrupt Control Unit ICU1 and an arbitration round for Interrupt Control Unit ICU0 is still pending, the arbitration unit Arb1 arbitrates for the Interrupt Control Units ICU0 and ICU1 in the time-multiplexed manner as discussed above.

FIG. 5 illustrates pipeline stages of an arbitration sequence for an arbitration unit Arb shared by three Interrupt Control Units ICUs simultaneously in accordance with an exemplary embodiment. Again, the arbitration may be performed in a time-multiplexed sequence, either fixed or flexible, but in this example the sequence is flexible.

The arbitration unit Arb begins Stage 1 of an arbitration among the Service Request Nodes SRN having pending service request interrupt signals ISs for Interrupt Control Unit ICU0, and this arbitration shifts through the pipeline stages as described above. As can be seen in the figure, a second arbitration is performed for Interrupt Control Unit ICU0. Then the arbitration unit Arb begins Stage 1 of an arbitration among the Service Request Nodes SRN having pending service request interrupt signals ISs for Interrupt Control Unit ICU2, and this arbitration shifts through its three stages. Similarly, the arbitration unit Arb starts Stage 1 of an arbitration among the Service Request Nodes SRN having pending service request interrupt signals ISs for Interrupt Control Unit ICU1, and this arbitration also shifts through its three stages. Again, in Stage 2 there is arbitration among the Service Request Node SRN winners of Stage 1, and in Stage 3 there is arbitration among the Service Request Node SRN winners of Stage 2, and at the end of Stage 3 the Service Request Node SRN with the highest priority for the associated Interrupt Control Unit ICU is revealed to associated Interrupt Service Provider ISP with the Interrupt Control Unit ICU sending a service request signal REQ.

In one exemplary embodiment, priority-basis arbitration may be performed. In other words, the arbitration unit Arb may provide one of its Interrupt Control Units ICUs priority over the others. This priority may be either dependent or independent on service request interrupt signals ISs being pending. For example, if one of the Interrupt Service Providers ISP having a pending service request interrupt signal is a DMA, the next arbitration round started by the arbitration unit Arb will be for the DMA's Interrupt Control Unit ICU. When this prioritized DMA Interrupt Control Unit ICU is not mapped to a Service Request Node SRN having one or more pending service request interrupt signals ISs, the arbitration unit Arb arbitrates for the other, non-prioritized Interrupt Control Units ICUs, such as those associated with CPUs, in a time-multiplexed sequence as described above.

In another exemplary embodiment, event-driven re-arbitration may be performed. The arbitration unit Arb may be configured to re-arbitrate among the Service Request Nodes SRN only when an event that might result in a new winner of an arbitration round is detected. If there is a competition between the same service request interrupt signals ISs that have already been arbitrated, there is no need to re-arbitrate because you already know the winner. By not re-arbitrating unless there is such a new event, there may be significant power savings.

In one exemplary embodiment an event that may trigger re-arbitration may be, for example, a Service Request Node SRN having a new service request interrupt signal IS. A new arbitration is needed because the Service Request Node SRN that has had the highest priority might no longer retain this status as the new Service Request Node SRN with its service request interrupt signal IS may have a priority that is higher.

In another exemplary embodiment, re-arbitration may be triggered by one of the Interrupt Service Providers ISPs acknowledging a service request interrupt signal IS. In other words, the Interrupt Service Provider ISP accepts the service request interrupt signal IS and executes the requested service. The Interrupt Control Unit ICU then clears the related Service Request Node SRN and its pending interrupt service request signal IS. The Interrupt Service Provider ISP is then available to accept a new request for service.

In other exemplary embodiments, re-arbitration may be triggered by other events such as an Interrupt Control Unit ICU acknowledging a service request interrupt signal IS of at least one of the Service Request Nodes SRNs, new hardware being detected, and at least one of the Service Request Nodes SRNs being enabled or disabled. Of course the disclosure is not limited to these examples. Re-arbitration may be triggered by any event that might result in a new winner of an arbitration round.

The area of a chip occupied by the service request interrupt router is based on numerous factors, such as the number of SRNs, the number of SRN control registers, the complexity of the arbitration unit logic, the number of ICUs, the number of parallel arbitration units, and the logic of the ICU interface to the associated ISP. Having greater than one ICU share an arbitration unit results in reduction of the area occupied by the service request interrupt router.

FIG. 6 illustrates a flowchart 600 of a method of routing service request interrupt signals ISs in accordance with an exemplary embodiment.

First, at Step 610, Service Request Nodes SRNs with pending service request interrupt signals ISs are mapped to Interrupt Control Units ICU0-ICUn.

At Step 620, an arbitration unit Arb, which is shared by these Interrupt Control Units ICUs, arbitrates among the Service Request Nodes SRNs having pending respective service request interrupt signals ISs, to determine for each of the Interrupt Control Units ICUs which of the Service Request Nodes SRNs has a highest priority. As discussed above, the arbitration may be performed for the ICUs in a time-multiplexed sequence, either flexible or fixed.

Optionally, lockstep arbitration may be performed to monitor for errors in the arbitration unit Arb. More specifically, a lockstep arbitration unit (not shown) is coupled in parallel with the arbitration unit Arb. At Step 630, the lockstep arbitration is performed in parallel with the arbitration in that both the lockstep arbitration unit and the arbitration unit Arb receive the same inputs at the same time. When the lockstep arbitration unit and the arbitration unit Arb do not provide the same output at the same clock cycle, at Step 640, an error is detected. This error could be within the arbitration unit Arb and/or within the lockstep arbitration unit. Such lockstep arbitration is generally used for an arbitration unit Arb arbitrating for an Interrupt Service Provider CPU0 . . . CPU3 . . . DMA that is considered to be safety-critical. The lockstep arbitration unit is substantially a duplicate of the arbitration unit Arb, and thus its separate, detailed illustration in this disclosure is not considered to be necessary.

Also optionally, a triple lockstep arbitration with qualified majority decision may be performed to monitor for errors in the arbitration unit Arb. More specifically, each of first and second lockstep arbitration units (not shown) is coupled in parallel with the arbitration unit Arb. At Step 650, each of the first and second lockstep arbitrations is performed in parallel with the arbitration in that each of the first and second lockstep arbitration units and the arbitration unit Arb receives the same input at the same time. When any of the first and second lockstep arbitration units and the arbitration unit Arb does not provide the same output at the same clock cycle, at Step 660, an error is detected. This error could be in any of the arbitration unit Arb and the first and second lockstep arbitration units. In Step 670, the two out of the three outputs that are the same are assumed to be correct, and the arbitration unit associated with the other output is assumed to have an error. Such triple lockstep arbitration is generally used for an arbitration unit Arb arbitrating for an Interrupt Service Provider CPU0 . . . CPU3 . . . DMA that is considered to be safety-critical. Each of the two lockstep arbitration units is substantially a duplicate of the arbitration unit Arb, and thus for this disclosure their separate, detailed illustrations are not considered to be necessary.

While the foregoing has been described in conjunction with exemplary embodiment, it is understood that the term "exemplary" is merely meant as an example, rather than the best or optimal. Accordingly, the disclosure is intended to cover alternatives, modifications and equivalents, which may be included within the scope of the disclosure.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. A service request interrupt router, comprising:
   Interrupt Control Units (ICUs); and
   a plurality of arbitration units, each configured to be shared by a subset of the ICUs to arbitrate in a time-sliced manner among Service Request Nodes (SRNs) that have respective service request interrupt signals and that are mapped to the subset of ICUs, to determine for each of the ICUs of the subset which of the SRNs has a highest priority.

2. The service request interrupt router of claim 1, wherein at least one of the plurality of arbitration units is further configured to be shared by greater than two ICUs.

3. The service request interrupt router of claim 1, wherein at least one of the plurality of arbitration units is further configured to arbitrate for any of its subset of ICUs, which are mapped to SRNs having respective service request interrupt signals, in a sequential sequence.

4. The service request interrupt router of claim 1, wherein at least one of the plurality of arbitration units is further configured to arbitrate for its subset of ICUs in a fixed sequential sequence, independent of its subset of ICUs being mapped to any SRNs having respective service request interrupt signals.

5. The service request interrupt router of claim 1, wherein at least one of the arbitration units is further configured to not arbitrate when none of its subset of ICUs is mapped to an SRN having a service request interrupt signal.

6. The service request interrupt router of claim 1, wherein at least one of the plurality of arbitration units is further configured to arbitrate for at least one of its subset of ICUs on a priority basis.

7. The service request interrupt router of claim 6, wherein when the at least one of its subset of ICUs having priority is not mapped to an SRN having a service request interrupt signal, the at least one of the plurality of arbitration units is further configured to arbitrate for the other, non-priority of its subset of ICUs in a sequential sequence.

8. The service request interrupt router of claim 6, wherein the at least one of the ICUs having priority is associated with a Direct Memory Access (DMA).

9. The service request interrupt router of claim 1, wherein the at least one of the plurality of arbitration nits is further configured to re-arbitrate among the plurality of SRNs only when an event occurs, wherein the event is selected from the group of events consisting of: new hardware is detected, at least one of the SRNs has a new service request interrupt signal, at least one of its subset of ICUs acknowledges a service request interrupt signal of at least one of the SRNs, and at least one of the SRNs is enabled/disabled.

10. The service request interrupt router of claim 1, further comprising a lockstep arbitration unit coupled in parallel with at least one of the plurality of the arbitration units, wherein when the lockstep arbitration unit and the at least one of the plurality of arbitration units provide different outputs, an error in the at least one of the arbitration units and the lockstep arbitration unit is detected.

11. The service request interrupt router of claim 1, further comprising at least two lockstep arbitration units, each coupled in parallel with at least one of the plurality of arbitration units, wherein when the at least one of the plurality of arbitration units and the lockstep arbitration units provides a different output, an error is detected based on a qualified majority decision.

12. A system-on-chip, comprising:
the service request interrupt router of claim 1;
Interrupt Services Providers (ISPs) respectively associated with the ICUs,
wherein at least one of the ISPs is a Direct Memory Access (DMA), and at least one of the ISPs is a Central Processing Unit (CPU).

13. A method for routing service request interrupts, comprising:
mapping Service Request Nodes (SRNs) to Interrupt Control Units (ICUs); and
arbitrating among the SRNs that have respective service request interrupt signals by a plurality of arbitration units,
wherein each of the plurality of arbitration units is configured to be shared by a subset of the ICUs, to arbitrate among SRNs mapped to the subset of ICUs, and to determine for each of the subset of ICUs which of the SRNs has a highest priority.

14. The method of claim 13, wherein the arbitration is performed for at least one of the subsets of ICUs in a sequential sequence.

15. The method of claim 13, wherein the arbitration is performed for at least one of the ICUs on a priority basis.

16. The method of claim 13, further comprising:
lockstep arbitrating in parallel with the arbitrating; and
detecting an error when the arbitrating and lockstep arbitrating provide different outputs.

17. The method of claim 13, further comprising:
first lockstep arbitrating in parallel with the arbitrating;
second lockstep arbitrating in parallel with the arbitrating and first lockstep arbitrating; and
detecting an error based on a qualified majority decision when at least one of the arbitrating, first lockstep arbitrating and second lockstep arbitrating provides a different output.

18. A service request interrupt router, comprising:
Interrupt Control Units (ICUs); and
a plurality of arbitration means, each shared by a subset of the ICUs, for arbitrating in a time-sliced manner among Service Request Nodes (SRNs) that have respective service request interrupt signals and that are mapped to the subset of ICUs, to determine for each of the ICUs of the subset which of the SRNs has a highest priority.

* * * * *

UNITED STATES PATENT AND TRADEMARK OFFICE
CERTIFICATE OF CORRECTION

| | | |
|---|---|---|
| PATENT NO. | : 9,575,912 B2 | Page 1 of 1 |
| APPLICATION NO. | : 14/247972 | |
| DATED | : February 21, 2017 | |
| INVENTOR(S) | : Frank Hellwig et al. | |

It is certified that error appears in the above-identified patent and that said Letters Patent is hereby corrected as shown below:

In the Claims

Column 8, Claim 9, Line 60, delete "nits" and insert --units--, therefor.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*